Dec. 9, 1930.    J. R. CARICKHOFF    1,784,722
CLUTCH CONSTRUCTION
Filed Nov. 22, 1928    2 Sheets-Sheet 1

J. R. Carickhoff
Inventor

Dec. 9, 1930.          J. R. CARICKHOFF          1,784,722
CLUTCH CONSTRUCTION
Filed Nov. 22, 1928          2 Sheets-Sheet 2

J. R. Carickhoff
Inventor
By C. A. Snow & Co.
Attorneys.

Patented Dec. 9, 1930

1,784,722

UNITED STATES PATENT OFFICE

JAMES R. CARICKHOFF, OF LEXINGTON, NORTH CAROLINA

CLUTCH CONSTRUCTION

Application filed November 22, 1928. Serial No. 321,218.

This invention relates to clutches for motor vehicles, and aims to provide novel means whereby the drive shaft and clutch shaft may be automatically disconnected to permit the rear wheels and drive shaft to run free, thereby reducing strain on the connecting rods and clutch shaft to the minimum.

An important object of the invention is to provide an overrunning clutch so that the direct drive high speed clutch of a transmission may be automatically locked to the clutch shaft when the clutch shaft is moving faster than the drive shaft, but which will release the direct drive high speed clutch when the drive shaft overruns the clutch shaft.

A still further object of the invention is to provide a device of this character, which may be installed as a part of the usual transmission construction, eliminating the necessity of making extensive alterations in the transmission construction to install the device.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
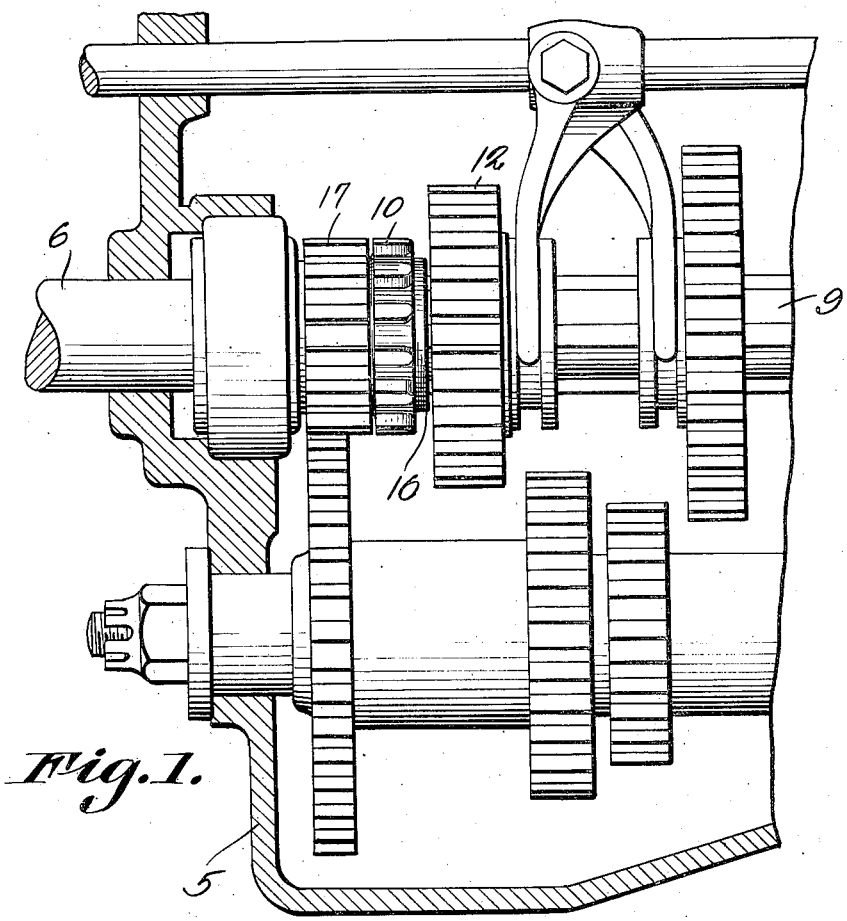
Figure 1 is a sectional view through a transmission housing illustrating a clutching mechanism constructed in accordance with the invention, as mounted on the clutch shaft.
Figure 5:
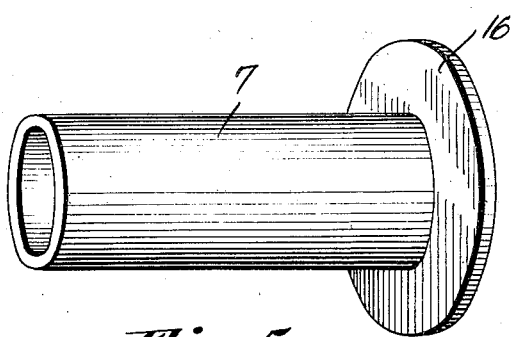
Figure 5 is a perspective view of the bushing inserted in one end of the clutch shaft.
Figure 2:
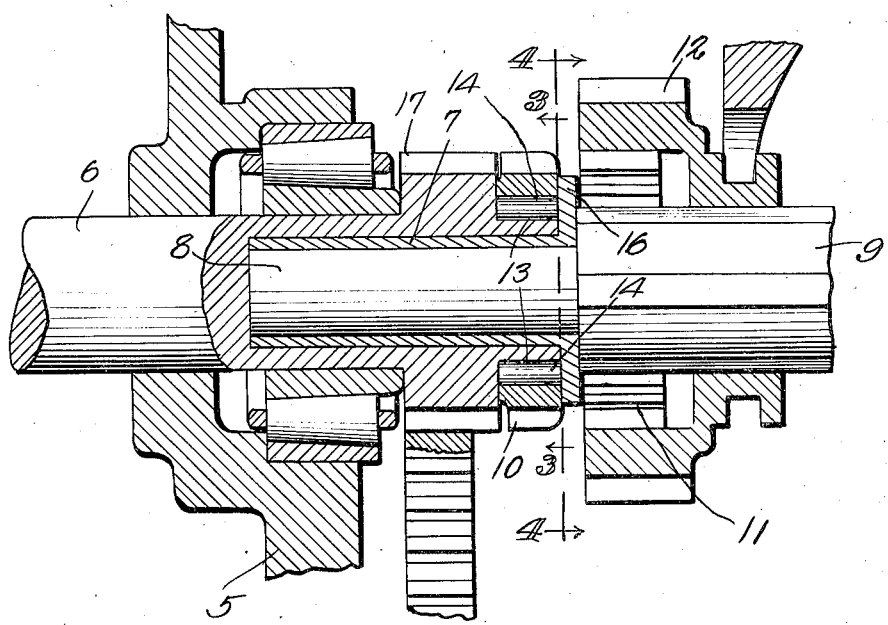
Figure 2 is a longitudinal sectional view through the drive end of the clutch shaft.

Referring to the drawings in detail, the reference character 5 designates a transmission housing in which the usual change speed gearing is mounted.

The reference character 6 designates the usual clutch shaft of a motor vehicle structure which is formed with an opening in one end into which the bushing 7 is positioned in which bushing the reduced end 8 of the drive shaft 9 operates. The direct drive high speed clutch member indicated at 10 is loosely mounted on the inner end of the clutch shaft 6 and is adapted to engage the internal teeth 11 of the gear 12 which is splined on the drive shaft 9 to directly connect the clutch shaft 6 and drive shaft 9 when the motor is running in high speed.

Figure 3:
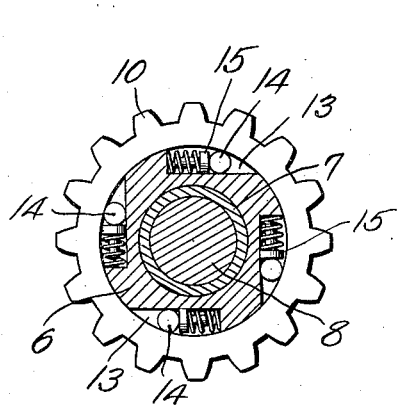
Figure 3 is a sectional view taken on line 3—3 of Figure 2.
Figure 4:
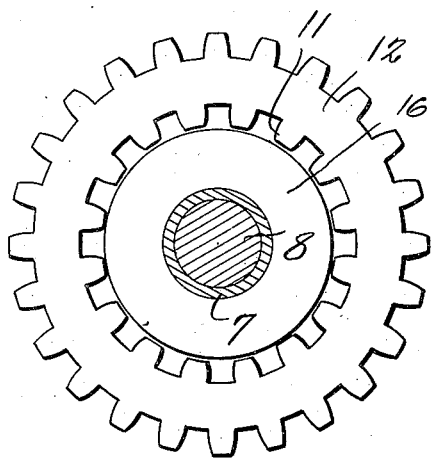
Figure 4 is a sectional view taken on line 4—4 of Figure 2.

As clearly shown by Figure 3 of the drawings, the inner end of the clutch shaft 6 is cut away defining pockets 13 in which the rollers 14 are positioned. Pins 15 are positioned within the pockets 13, the pins acting as supports for the coiled springs positioned in the pockets, which springs normally act to urge the rollers 14 outwardly into engagement with the inner surface of the high speed clutch member 10, and providing what is commonly known as an overrunning clutch.

The bushing 7 is formed with a flange 16 at its outer end, which flange is of a width to completely cover the cut out portions 13 and to overlie one edge of the direct drive high speed clutch member 10 to hold the clutch member 10 on the clutch shaft 6.

Should it be desired to eliminate the action of the overrunning clutch, as for example during city driving wherein traffic is congested, it is only necessary to move the gear 12 to the limit of its forward movement to cause the gear 12 to move over the high speed clutch member 10 and connect with the gear 17 whereupon a direct drive will be provided through the gears 12 and 17.

From the foregoing it will be obvious that when the clutch shaft 6 is rotated at a greater speed than the drive shaft 9, providing the gear 12 is moved to engage the direct high speed clutch member 10, the rollers 14 will be thrown outwardly or into engagement with the inner surface of the high speed clutch member 10 locking the high speed clutch member 10 to the clutch shaft 6, to drive the shaft 9 which in turn transmits movement to the rear axle of the motor vehicle to propel the motor vehicle.

When the drive shaft 9 rotates at a greater rate of speed than the clutch shaft, due to the motor vehicle drifting down a grade, it is obvious that the rollers 14 will be moved inwardly, and the drive shaft 9 permitted to rotate independently of the clutch shaft 6, relieving the crank shaft and connecting rods of the engine of undue strain.

I claim:

In a transmission, a clutch shaft, a tubular bushing within the free end of the clutch shaft, said bushing having a flange resting against one end of the clutch shaft, a direct drive high speed clutch member on the clutch shaft, said clutch shaft having recesses formed in one end thereof, roller clutch members in the recesses and engaging the direct drive high speed clutch member for locking the direct drive high speed clutch member to the clutch shaft, said flange of the bushing covering the recesses, a drive shaft having one end thereof disposed in the bushing to rotate therein, and means for transmitting movement of the drive shaft to the direct drive speed clutch member.

In testimony that I claim the foregoing as my own, I have hereto affixed my signature.

JAMES ROBERT CARICKHOFF.